G. B. WESSEL.
CABLE GUARD.
APPLICATION FILED SEPT. 28, 1915. RENEWED JAN. 6, 1917.
1,221,006. Patented Mar. 27, 1917.
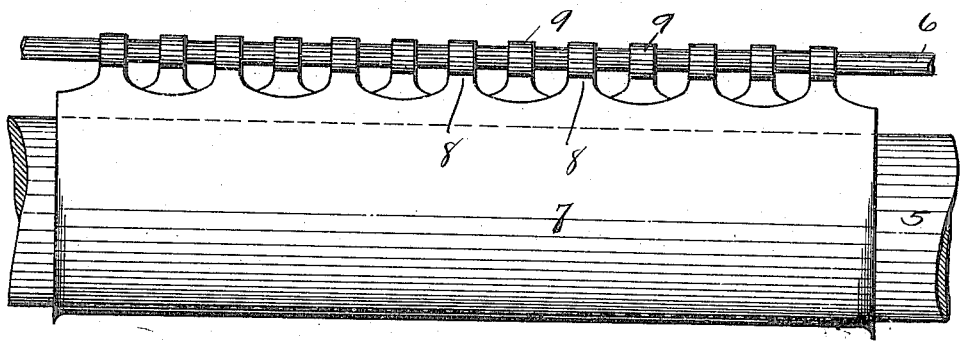
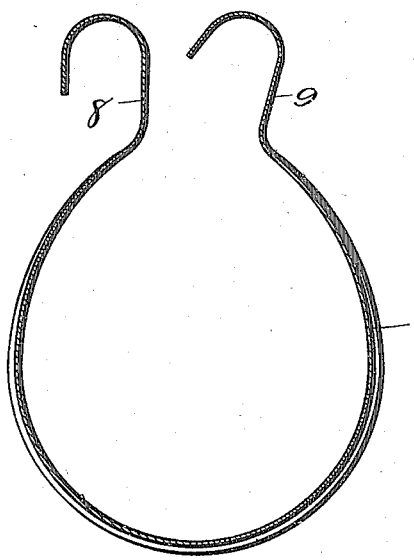
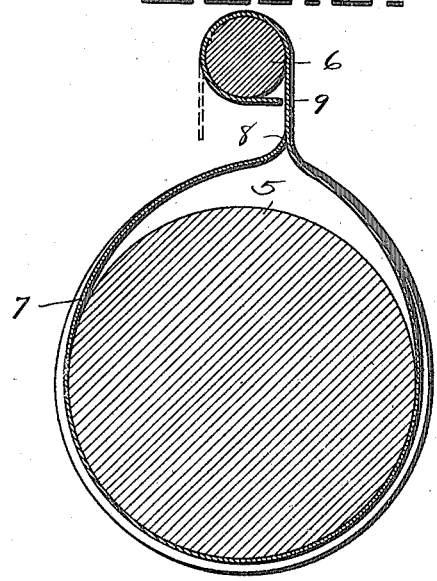
WITNESSES
INVENTOR
GEORGE B. WESSEL
ATTY.

UNITED STATES PATENT OFFICE.

GEORGE B. WESSEL, OF ST. LOUIS, MISSOURI, ASSIGNOR OF ONE-HALF TO JOHN H. LUEBBERT, OF ST. LOUIS, MISSOURI.

CABLE-GUARD.

1,221,006.                 Specification of Letters Patent.      Patented Mar. 27, 1917.

Application filed September 28, 1915, Serial No. 53,123. Renewed January 6, 1917. Serial No. 140,980.

*To all whom it may concern:*

Be it known that I, GEORGE B. WESSEL, a citizen of the United States, residing at St. Louis, State of Missouri, have invented certain new and useful Improvements in Cable-Guards, of which the following is a specification.

This invention relates to cable guards for telephone cables and it has for its object the provision of a simple and inexpensive device adapted to be readily applied to the cable and which when in place will prevent the cable from being worn or cut by rubbing against trees, poles or other foreign bodies.

Further objects and advantages of the invention will be set forth in the detailed description which now follows.

In the accompanying drawings:

Figure 1 is a side elevation of a guard constructed in accordance with the invention and showing the same applied to a cable.

Fig. 2 is a transverse vertical section therethrough with the cable removed and with the supporting hooks out of engagement with the supporting or messenger wire, and Fig. 3 is a like view with the cable and supporting or messenger wire in position.

Like numerals designate corresponding parts in all of the figures of the drawing.

Referring to the drawing, the numeral 5 designates the usual lead covered telephone cable and 6 the usual supporting or messenger wire from which this cable is ordinarily supported.

The device forming the subject matter of the present invention comprises a bowed body portion 7 within which the cable has its seating, the opposite edges of this body portion being bent to form hook extensions 8 and 9; the hook extensions 9 being staggered with relation to the hook extensions 8, so that the hooks 9 may enter the spaces between the hooks 8 and vice versa.

It is believed that the operation of the device will be apparent without further remarks. However it may be briefly stated that after the opposite edges of the body 7 have been sprung apart sufficiently to permit the body to embrace the cable, the hook extensions 8 and 9 are engaged over the supporting wire 6 and bent firmly into engagement therewith as illustrated in Fig. 3, at which time the structure not only aids in supporting the cable but effectually guards the cable against abrasion at points where it passes trees, poles or other objects with which it would be likely to come into contact.

It is to be remarked that this device is made of a single and integral piece of metal, consequently that it may be readily struck from sheet metal at a very slight cost.

While the elements shown and described are well adapted to serve the purposes for which they are intended it is to be understood that the invention is not limited to the precise construction set forth, but includes within its purview such changes as may be made within the scope of the appended claim.

Having described my invention what I claim is:

A cable guard made from an integral sheet of metal bent to bowed formation and provided with a plurality of hooks along each of its edges, the hooks along one of said edges being staggered with relation to the hooks along the other of said edges and said hooks along one edge entering the spaces between the hooks along the other of said edges, whereby all of said hooks complementally engage the messenger wire.

In testimony whereof I affix my signature in presence of two witnesses.

GEORGE B. WESSEL.

Witnesses:
FRANK B. BELLS,
T. R. FOWLER.

Copies of this patent may be obtained for five cents each, by addressing the "Commissioner of Patents, Washington, D. C."